(12) United States Patent
Yang

(10) Patent No.: US 6,495,970 B1
(45) Date of Patent: Dec. 17, 2002

(54) LAMP STAND WITH MULTI-STAGE LIGHT MODULATION

(75) Inventor: Wen Ho Yang, Taipei Hsien (TW)

(73) Assignee: Sun Lite Sockets Industry Inc., Taoyuan Hsien (TW)

( * ) Notice: Subject to any disclaimer, the term of this patent is extended or adjusted under 35 U.S.C. 154(b) by 0 days.

(21) Appl. No.: 09/987,293

(22) Filed: Nov. 14, 2001

(51) Int. Cl.$^7$ ................................................ H05B 37/00
(52) U.S. Cl. .................. 315/245; 315/DIG. 4; 315/219; 315/244; 315/291; 315/307
(58) Field of Search .................. 315/DIG. 4, 219, 315/244, 245, 224, 291, 307, 308, 311, 243

(56) References Cited

U.S. PATENT DOCUMENTS

| | | | | | |
|---|---|---|---|---|---|
| 4,288,725 A | * | 9/1981 | Morton | ...................... | 315/245 |
| 4,647,820 A | * | 3/1987 | Chermin et al. | ............ | 315/245 |
| 4,961,029 A | * | 10/1990 | Shimizu et al. | ............. | 315/219 |
| 5,343,125 A | * | 8/1994 | Bernitz et al. | .............. | 315/245 |
| 5,500,575 A | * | 3/1996 | Ionescu | ....................... | 315/307 |
| 5,668,444 A | * | 9/1997 | Pacholok | ..................... | 315/224 |
| 5,949,197 A | * | 9/1999 | Kastner | ....................... | 315/291 |

* cited by examiner

Primary Examiner—Tho Phan
(74) Attorney, Agent, or Firm—Bacon & Thomas, PLLC

(57) ABSTRACT

A lamp stand with multi-stage light modulation includes plural resistors annularly arranged to form a circular space. The resistors have terminals soldered on the outer walls of U-shaped contact blades, with an empty position terminal provided in the circular space. A light-modulating controller extends in the lamp stand, having a rotor formed with plural slopes on an outer wall for rotor copper strips to rest thereon. A trigger diode is connected to the gate of a triac AC switch and a capacitor is connected to the trigger diode and the paralleled terminals of the resistors and to the main terminals of the triac AC switch. The light-modulating controller is rotated to let the rotor copper strips contact the contact strips of the resistors to turn on power and charge the capacitor. Different resistance values change the breakdown speed of the DIAC and control the gate of the TRIAC to change the voltage effective value of the lamp, thus reaching a goal of light modulating.

1 Claim, 4 Drawing Sheets

(A—A)

LAMP STAND WITH MULTI-STAGE LIGHT MODULATION

BACKGROUND OF THE INVENTION

This invention relates to a lamp stand with multi-stage light modulation, particularly to one having a function of stabilizing multi-stage light modulation and needless to use a specially-made lamp but a common incandescent one for light modulating.

A conventional lamp stand with multi-stage light modulation is provided with a specially made lamp and other circuits, lacking practicability and increasing producing cost.

SUMMARY OF THE INVENTION

The objective of the invention is to offer a lamp stand with multi-stage light modulation provided with only a common incandescent lamp for light modulation, needless to use a specially made lamp and having stability in controlling light modulation.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
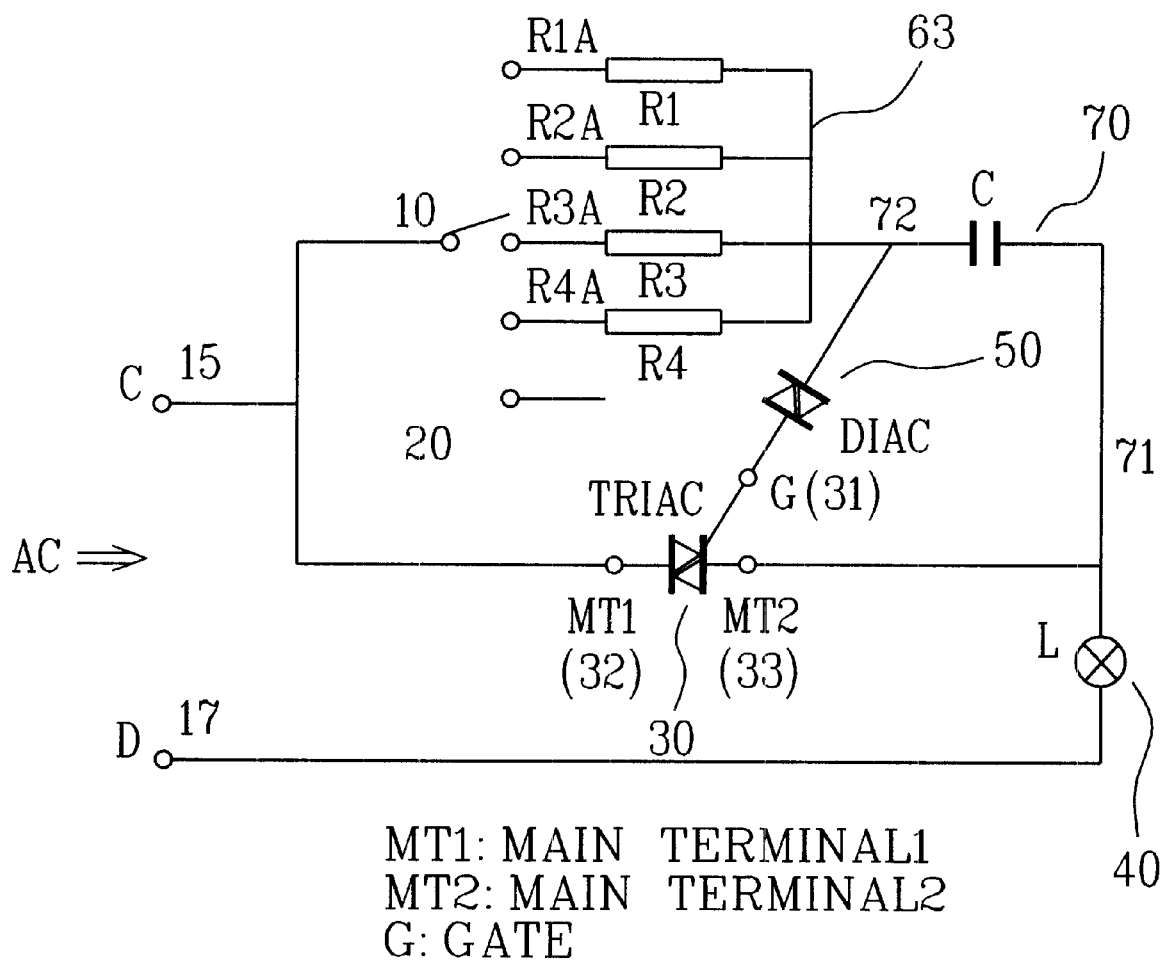
FIG. 1 is a circuit diagram of a lamp stand with multi-stage light modulation in the present invention.

A preferred embodiment of the circuit of a lamp stand with multi-stage light modulation in the present invention, as shown in FIG. 1, includes four resistors R1, R2, R3 and R4, an empty position terminal 20, a triac AC switch 30 (TRIAC), a light-modulating controller 10, and a bilateral trigger diode 50 (DIAC) as main components electrically combined together.

The resistance values of the four resistors R1, R2, R3 and R4 can be arranged orderly from a largest one to a smallest one (i.e. R1>R2>R3>R4) or arranged inversely (i.e. R1<R2<R3<R4) and more than four resistances can be used. Basically, one terminal of each of these four resistors is connected with one another in parallel and the other terminals of them are connected with and controlled by a light-modulating controller 10 to select which one for electric current to pass throuch.

The empty position terminal 20 is only used for the light-modulating controller 10 to contact, not connected with any other components so it can be regarded as a circuit breaker of the light-modulating controller 10, that is, when the light-modulating controller 10 contacts with the empty position terminal 20, the whole light-modulating circuit is broken.

The triac AC switch 30 (TRIAC), also called a double-way gate member, has three terminal elements MT1 (main terminal 1), MT2 (main terminal 2) and G (GATE) for controlling the average current of the load. Basically, the triac AC switch and the silicon-controlled rectifier (SCR) can equally enter an ON condition by the signal of the gate (G). The difference between them is that the current made connection by the TRIAC can flow in two directions, but, when the triac AC switch 30 is turned off, no current flowing between the MT1 and the MT2 and at this time, the TRIAC 30 is like an open-circuit switch, no matter whether voltage is positive or negative. On the contrary, if the TRIAC 30 is turned on, the current resistance between the MT1 and the MT2 is extremely small so that current can flow through them. According to the characteristic of the TRIAC described above, in making a circuit distribution, the MT1 is connected to the terminal of the light modulating controller 10 and to the terminal (C) of an AC source, the MT2 is connected to one terminal of the lamp stand and the gate (G) connected to one terminal of a diode AC switch (DIAC).

The diode AC switch (DIAC) also called a bilateral trigger diode 50 is an AC trigger element capable to conduct and react to an AC signal of plus or minus semi-circular current so that the DIAC can cooperate with the TRIAC and correct the trigger angle of the TRIAC. In making a circuit distribution, one terminal of the DIAC is connected to the Gate (G) of the TRIAC and the other terminal connected to the terminal of a capacitor (C). Then one of the terminals of the capacitor (C) is connected to the paralleled terminal of the four resistors R1, R2, R3 and R4 and the other connected to the MT2 of the TRIAC, that is, connected to one terminal of the lamp stand 40, with the other terminal of the lamp stand 40 connected to the terminal D of the AC source.

In accordance with the circuit described above, to modulate light of a lamp, the light-modulating controller 10 is selectively operated to contact with one of the four resistors R1, R2, R3 and R4 or the empty position terminal 20. If the light-modulating controller 10 is made to contact with the empty position terminal 20, the lamp of the lamp stand 40 is not lit. But, when the light-modulating controller 10 contacts with one of the four resistors R1, R2, R3 and R4, electric current will flow through the resistance it touches and charge the capacitor (C) (constant of charging time T=R·C) and indirectly control the time of breakdown voltage of the DIAC, thus reaching a goal of controlling the luminance of the lamp of the lamp stand 40.

In other words, if the light-modulating controller 10 contacts with different resistance values, the charging speeds of the capacitor (C) are not the same. For instance, in case the light-modulating controller 10 contacts with a relatively large resistance element, the time needed for reaching a breakdown voltage of the DIAC will increase, that is, a R-C circuit can be used to generate a trigger voltage at the gate (G) and turn on the TRIAC, so, when the DIAC reaches a breakdown voltage and turn on, the gate (G) of the TRIAC will be triggered and make the load lamp of the lamp stand 40 lit up by degrees. Therefore, in case the light-modulating controller 10 contacts with a relatively small resistance element, the charging speed of the R-C will certainly increase, the breakdown of the DIAC become fast and the trigger phase angle of the gate (G) of the TRIAC become small, and thus, the voltage effective value of the load lamp becomes large so the luminance of the lamp increases. That is to say, if the resistance values of the four resistors R1, R2, R3 and R4 are orderly arranged from a largest one to a smallest one, the luminance of the lamp of the lamp stand 40 will gradually become brighter and brighter. On the contrary, in case they are arranged in an inverse order, the lamp will become less and less brighter.

Figure 2:
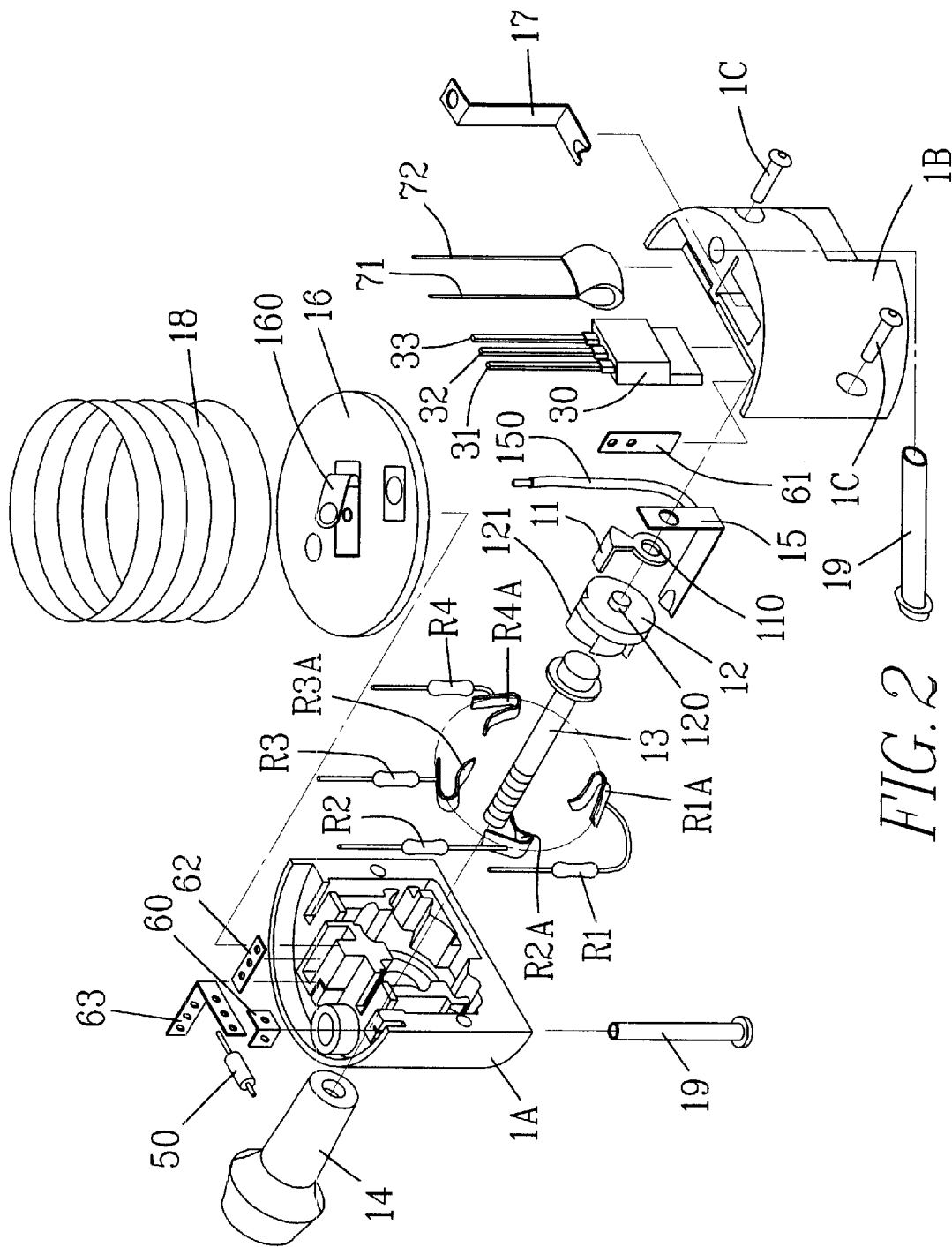
FIG. 2 is an exploded perspective view of the lamp stand with multi-stage light modulation in the present invention.

A preferred embodiment of a lamp stand with multi-stage modulation provided with the above-described circuit in the present invention, as shown in FIG. 2, includes a lamp stand 1, four resistors R1, R2, R3 and R4, a light modulating controller 10, a triac AC switch 30 and a bilateral trigger diode 50 as main components electrically combined together.

The lamp stand is composed of two semi-circular housings 1A and 1B combined together with a fastening member 1C (such as a river) for receiving other components inside.

The four resistors R1, R2, R3 and R4 are provided on the space separated inside the lamp stand 1. The four resistors R1, R2, R3 and R4 have their pins respectively soldered fixedly on the outer walls of U-shaped contact blades R1A, R2A, R3A and R4A having a conductive function. The contact blades R1A, R2A, R3A and R4A have their side walls arranged spaced apart, forming a circular space inside the lamp stand 1, as shown in FIG. 4, with an empty position terminal 20 (circuit-breaking position) positioned in the circular space.

The light-modulating controller 10 has one end extending in the lamp stand 1 and the other end extending out of the lamp stand 1 for rotating and controlling. The light-modulating controller 10 positioned inside the lamp stand 1 is provided with a bending rotor copper strip 11 having a shaft hole 110 at one end to be fitted around the protruding shaft 120 of a rotor 12. The rotor 12 is formed with a plurality (preferably five for the four resistors and the empty position terminal) of ratchet-shaped slopes 121 protruding around its outer wall for the rotor copper strips 11 to rest thereon so that the rotor 12 can rotate to activate the rotor copper strip 11 to shift, with the protruding slopes 121 corresponding to the resistances R1, R2, R3 and R4. Further, the rotor 12 is controlled to rotate by a rotating rod 13 controlled by a rotating handle 14 extending out of the lamp stand 1. Thus, the rotating handle 14 can be operated to control rotation of the rotor 12.

Figure 4:
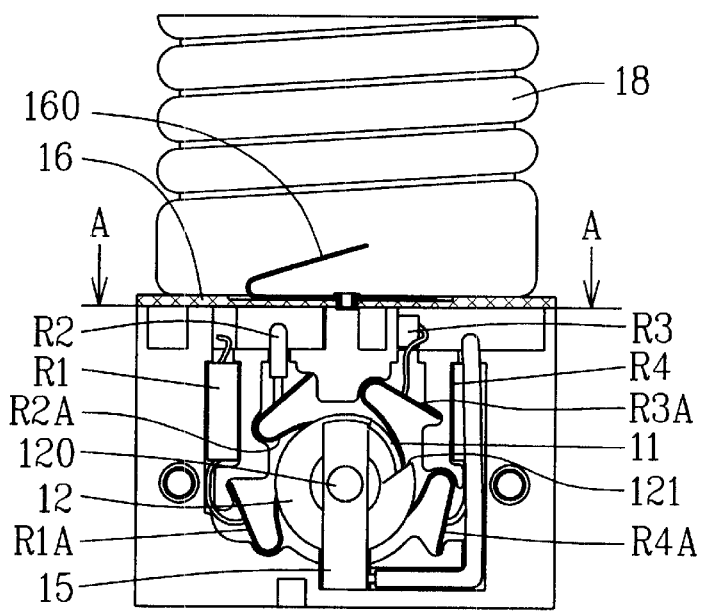
FIG. 4 is a side cross-sectional view of the lamp stand with multi-stage light modulation in the present invention.

In such a way of controlling and rotating, the rotor 12 can be fitted inside the circular space formed by the ontact blades R1A, R2A, R3A and R4A and controlled to rotate by the rotor copper strip 11 and by the contact blades R1A, R2A, R3A, R4A of the resistors R1, R2, R3 and R4, as shown in FIG. 4. Then, a power conductive strip 15 is fitted around the protruding shaft 120 of the rotor 12, after the rotor copper strip 11 is fitted thereon, and connected to a terminal (C) of the power-supply in order to let the current flow through the resistors R1, R2, R3, and R4 for controlling light modulating, as shown in FIG. 1.

Figure 5:
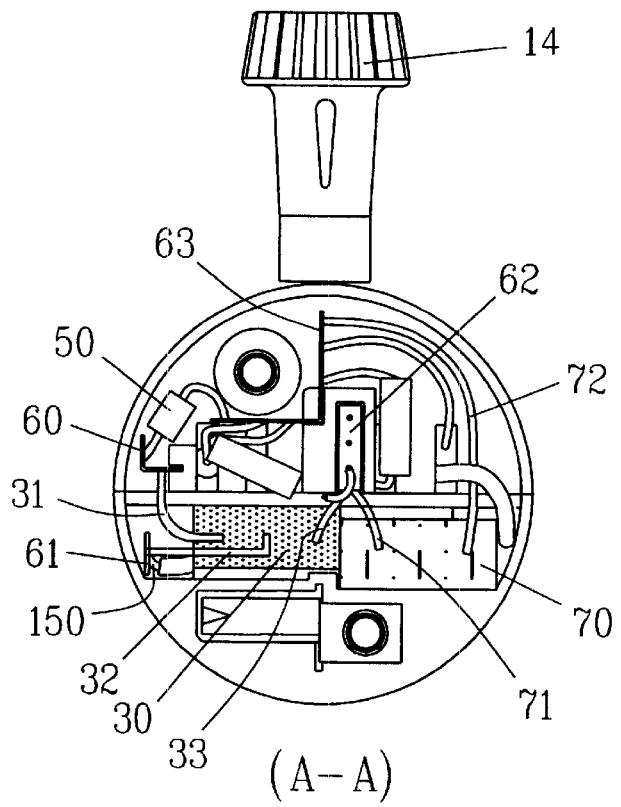
FIG. 5 is a cross-sectional view of the line A—A in FIG. 4.

The triac AC switch 30 (TRIAC), also called a double-way gate, has three terminals 31, 32 and 33 respectively called G pole (gate), MT1 (main terminal 1) and MT2 (main terminal 2). The terminal 31 (gate) is connected to a terminal of a trigger diode 50 (DIAC) by a solder connecting strip 60 serving as a conductive bridge, as shown in FIG. 5. The terminal 32 (MT1) is soldered on a solder connecting strip 61 soldered with a conductor 150 connected to the power conductive strip 15 to let the terminal 32 (MT1) of the TRIAC 30 and the power conductive strip 15 become the same potential, as shown in FIG. 1. The terminal 33 (MT2) is soldered on a solder connecting strip 62 fixedly soldered with a pin 71 of a capacitor 70 and also contacting with the tongue 160 protruding on the bakelite plate 16 of the lamp stand 1 so that the terminal 33 (MT2), the pin 71 of the capacitor 70 and the tongue 160 of the lamp stand 1 become the same potential, as shown in FIG. 1.

Figure 3:
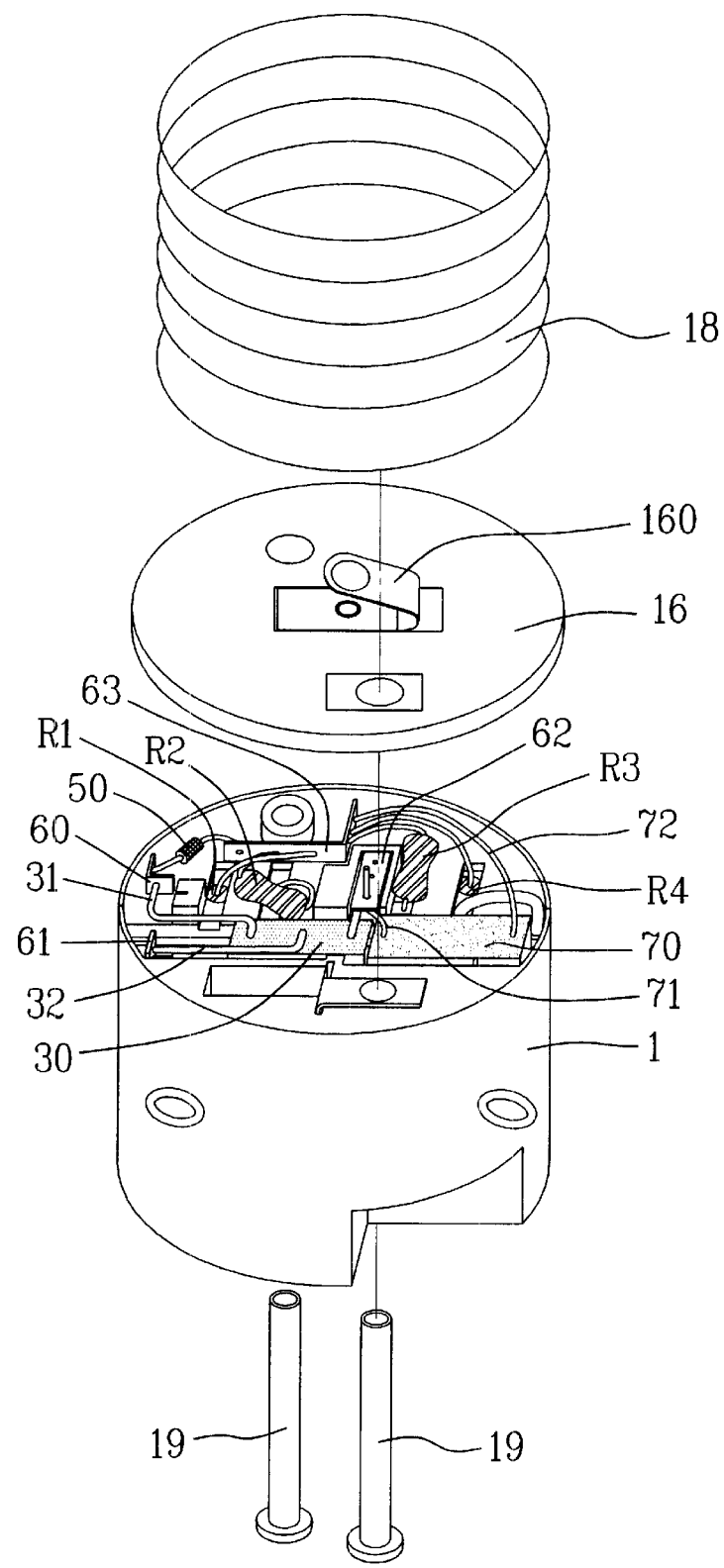
FIG. 3 is a partly exploded perspective view of the lamp stand with multi-stage light modulating in the present invention.

The trigger diode 50 (DIAC) has one of the terminals connected to the Gate (G) of the Triac AC Switch 30 and the other connected to the pin 72 of the capacitor 70 by means of a solder connecting strip 63 connected to the paralleled terminal of all the resistances R1, R2, R3 and R4 to form a common potential. Lastly, a power-supply conductive strip 17 is connected to the negative of the lamp stand 1, that is, the coiled bulb holder 18 of the lamp stand 1 is fixed on the bakelite plate 16 with a rivet 19, as shown in FIGS. 3, 4 and 5, and then connected with the power supply conductive strip 17 to form an integral control circuit (with its terminal D shown in FIG. 1).

By so designing, the resistances R1, R2, R3, R4 and the empty position terminal 20 are arranged in order around a circle and the contact blades R1A, R2A, R3A and R4A on the resistors R1, R2, R3 and R4 can contact with the rotor copper strips 11. In addition, when the rotor copper strip 11 is stuck on one of the five slopes 121 of the rotor 12, it can contact with only one contact blade R1A, R2A, R3A or R4A a time (no contact strip provided on the empty position terminal). Thus, only turn around the rotating handle 14 and the light of the lamp can be modulated with one round because the resistance values of the four resistors R1, R2, R3 and R4 are different, therefore the charging time of the capacitor 70 determines the speed of the breakdown voltage of the trigger diode 50 (DIAC), and thus the effective voltage supplied to the lamp of the lamp stand 1 can be changed, achieving effect of modulating the light of the lamp.

As can be noted from the structure and the circuit design described above, this invention has a function of stably controlling multi-stage light modulating and besides, a common incandescent lamp can be used for light modulation, needless to use a specially-made lamp.

While the preferred embodiment of the invention has been described above, it will be recognized and understood that various modifications may be made therein and the appended claims are intended to cover all such modifications that may fall within the spirit and scope of the invention.

I claim:

1. A lamp-stand of multi-stage light modulating comprising:

lamp-stand for fitting a lamp;

a plurality of resistors provided spaced apart forming a circular space inside said lamp stand, said resistors arranged orderly according to values of said resistors, having their terminals respectively soldered on outer side walls of U-shaped contact blades able to conduct, an empty position terminal provided in said circular space without connecting with other elements;

a light modulating controller having one end extending into said lamp stand and the other end extending out of said lamp stand to be rotated for controlling and modulating brightness of the lamp, said light modulating controller inside said lamp stand provided with a bent rotor copper strip having a shaft hole at one end for fitting around the protruding shaft of a rotor, said rotor formed with a plurality of ratchet-shaped slopes protruding on an outer wall, said rotor copper strip resting against one of said ratchet-shaped slopes so as to let said rotor rotate to activate said rotor copper strip to shift, said rotor controlled to rotate by a rotating rod controlled by a rotating handle extending out of said lamp stand, said rotor extending into said circular space formed by said resistors to allow said rotor copper strip contact with said contact blades respectively soldered with the pins of said resistors, the other terminals of said resistors connected in parallel;

a triac AC switch (TRIAC) having its first main terminal formed in a same potential with said rotor copper strip, its second main terminal set in a same potential as one end of the power of said lamp stand, and its gate positioned in a same potential as a trigger diode (DIAC);

said trigger diode (DIAC) having one terminal connected to said gate of said triac AC switch and the other terminal connected to a terminal of a capacitor as well as to the paralleled terminals of said resistors to form a same potential, the other terminal of said capacitor and two main terminals of said triac AC switch (TRIAC) connected to a power terminal of said lamp stand to form a same potential, and the other power terminal of said lamp staand connected to power to form a controlling circuit;

said rotating handle turned around to control said rotor copper strip to contact with one of said contact blades of said resistors after said lamp stand is powered, said resistors respectively producing different charge times to said capacitor, speed of reaching a breakdown voltage of said trigger diode determined by said charge time of each said resistor, said gate of said triac AC switch (TRIAC) activated to generate a trigger voltage turn on said TRIAC and let the lamp of said lamp stand lit up gradually, the charging speed of said capacitor as well as the breakdown of said trigger gradually becoming faster and the trigger phase angle of said gate of said TRIAC becoming smaller and smaller in case of said rotor copper strip contacts with said resistors arranged orderly from a largest resistance value to a smallest one, the voltage effective value of the lamp enlarged to let said lamp become brighter and brighter when modulated, in case of said rotor copper strip contacting with said resistances arranged from a small resistance value to large one, said lamp becoming darker and darker in case of said rotor copper strip contacting with said resistors arranged orderly from a smallest resistance value to a largest one.

* * * * *